(12) United States Patent
Zhang et al.

(10) Patent No.: US 12,413,348 B2
(45) Date of Patent: Sep. 9, 2025

(54) TRANSMISSION CONFIGURATION INDICATOR DETERMINATION AND ACKNOWLEDGMENT

(71) Applicant: Apple Inc., Cupertino, CA (US)

(72) Inventors: Yushu Zhang, Beijing (CN); Chunxuan Ye, San Diego, CA (US); Dawei Zhang, Saratoga, CA (US); Haitong Sun, Saratoga, CA (US); Hong He, San Jose, CA (US); Huaning Niu, San Jose, CA (US); Oghenekome Oteri, San Diego, CA (US); Sigen Ye, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/651,560

(22) Filed: Apr. 30, 2024

(65) Prior Publication Data
US 2024/0283575 A1 Aug. 22, 2024

Related U.S. Application Data

(62) Division of application No. 17/439,376, filed as application No. PCT/CN2021/070895 on Jan. 8, 2021, now Pat. No. 12,068,861.

(51) Int. Cl.
*H04L 1/18* (2023.01)
*H04L 1/00* (2006.01)
*H04L 1/1829* (2023.01)
*H04W 72/23* (2023.01)

(52) U.S. Cl.
CPC .......... *H04L 1/1854* (2013.01); *H04L 1/0061* (2013.01); *H04L 1/1864* (2013.01); *H04W 72/23* (2023.01)

(58) Field of Classification Search
CPC ... H04L 1/1854; H04L 1/0061; H04L 1/1864; H04W 72/23
See application file for complete search history.

(56) References Cited

U.S. PATENT DOCUMENTS

| | | | |
|---|---|---|---|
| 12,068,861 B2 | 8/2024 | Zhang et al. | |
| 2019/0115955 A1* | 4/2019 | John Wilson | H04L 5/0055 |
| 2019/0222289 A1 | 7/2019 | John Wilson et al. | |
| 2020/0314858 A1* | 10/2020 | Xu | H04W 72/21 |
| 2021/0259004 A1* | 8/2021 | Takeda | H04L 1/08 |
| 2022/0386332 A1 | 12/2022 | Yokomakura et al. | |

(Continued)

FOREIGN PATENT DOCUMENTS

CN 110661594 A 1/2020

OTHER PUBLICATIONS

3GPP TS 38.213 V16.3.0, 3rd Generation Partnership Project; Technical Specification Group Radio Access Network, NR, Physical Layer Procedures for Control (Release 16), Sep. 2020, 179 pages.

(Continued)

*Primary Examiner* — Brenda H Pham
(74) *Attorney, Agent, or Firm* — Kilpatrick Townsend & Stockton LLP

(57) ABSTRACT

The present application relates to devices and components including apparatus, systems, and methods for determining and acknowledging transmission configuration indicator states.

17 Claims, 14 Drawing Sheets

(56) References Cited

U.S. PATENT DOCUMENTS

2023/0354350 A1 11/2023 Matsumura et al.

OTHER PUBLICATIONS

3rd Generation Partnership Project; Technical Specification Group Radio Access Network; NR; Physical Layer Procedures for Data (Release 16), 3GPP TS 38.214 V16.3.0, Sep. 2020, 167 pages.
Summary of Enhancements on Multi-TRP/Panel Transmission, 3GPP TSG RAN WG1 Meeting #98, R1-1909602, Aug. 26-30, 2019, 76 pages.
U.S. Appl. No. 17/439,376, Non-Final Office Action, Mailed on Nov. 13, 2023, 9 pages.
International Patent Application No. PCT/CN2021/070895, International Preliminary Report on Patentability, Mailed on Jul. 20, 2023, 6 pages.
International Patent Application No. PCT/CN2021/070895, International Search Report and Written Opinion, Mailed on Oct. 9, 2021, 12 pages.
International Patent PCT/CN2021/070895, Invitation to Pay Additional Fees and, Where Applicable, Protest Fee, May 19, 2021, 2 pages.
Enhancements on Multi-beam Operation, 3 Generation Partnership Project Technical Specification Group Radio Access Network Working Group 1 Meeting #103-e, R1-2009288, Oct. 26-Nov. 13, 2020, 20 pages.
Moderator Summary#4 for Multi-beam Enhancement, 3 Generation Partnership Project Technical Specification Group Radio Access Network Working Group 1#103-e, R1-2009715, Oct. 26-Nov. 13, 2020, 16 pages.
European Patent Application No. 21916829.1, Partial Supplementary European Search Report, Aug. 2, 2024, 12 pages.
European Patent Application No. 21916829.1, Extended European Search Report, Mailed on Oct. 23, 2024, 9 pages.
On Rel-16 UE Features, 3Generation Partnership Project Technical Specification Group Radio Access Network Working Group1 #100, R1-2000351, vol. RAN WG1, Feb. 24-Mar. 6, 2020, pp. 1-32.
European Patent Application No. 21916829.1, Office Action, Jul. 3, 2025, 6 pages.
Korea Patent Application No. 10-2023-7022951, Office Action, Jul. 8, 2025, 9 pages.

* cited by examiner ns may be used

TRANSMISSION CONFIGURATION INDICATOR DETERMINATION AND ACKNOWLEDGMENT

CROSS-REFERENCE TO RELATED APPLICATIONS

This application is a divisional application of U.S. patent application Ser. No. 17/439,376, filed Sep. 14, 2021, which is a U.S. National Stage Patent Application of PCT/CN2021/070895, filed Jan. 8, 2021. The disclosures of which are herein incorporated by reference in their entireties for all purposes.

BACKGROUND

Transmission configuration indicator (TCI) states may be configured by radio resource control (RRC) signaling. A subset of the configured TCI states may be activated by a media access control (MAC) control element (CE). In Release 15 of Third Generation Partnership Project (3GPP), downlink control information (DCI) used to schedule a physical downlink shared channel (PDSCH) may also indicate one or more TCI states from the activated states that are to be applied to the PDSCH resource allocation. The UE may decode the PDSCH using quasi co-location (QCL) information provided by the applied TCI states. In Release 17 of 3GPP, the indicated TCI in DCI may be applicable for multiple channels, but the old TCI would still be applied for PDSCH scheduled by the same DCI. Release 17 further introduces a unified TCI framework in which each TCI codepoint can be associated with a TCI for joint uplink and downlink beam indication, or associated with one or two TCIs for separate uplink and downlink beam indication.

DETAILED DESCRIPTION

Figure 1:
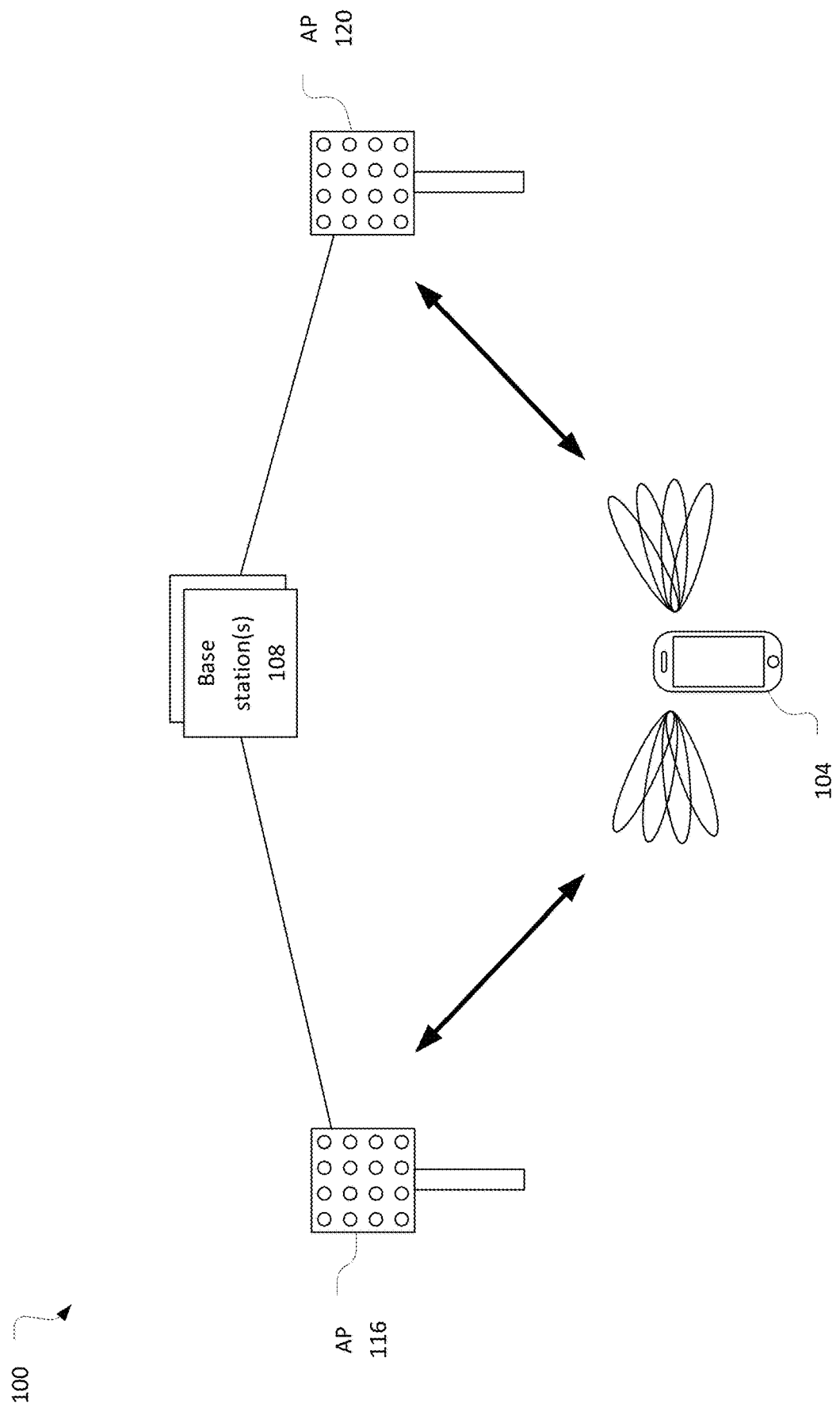
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and one or more base station(s) 108. The base station(s) 108 may provide one or more wireless serving cells, for example, 3GPP New Radio (NR) cells, through which the UE 104 may communicate with the base station(s) 108.

The UE 104 and the base station(s) 108 may communicate over an air interface compatible with 3GPP technical specifications such as those that define Fifth Generation (5G) NR system standards. The base station(s) 108 may include a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

The base station(s) 108 may be coupled with one or more distributed antenna panels (APs), for example, AP 116 and AP 120. The distributed APs 116/120 may be implemented in transmit-receive points (TRPs) or other devices. In general, the base station(s) 108 may perform the majority of the operations of a communication protocol stack, including scheduling, while the APs 116/120 act as distributed antennas. In some embodiments, the APs 116/120 may perform some lower-level operations of the communication protocol stack (for example, analog physical (PHY) layer operations).

The base station(s) 108 may use the APs 116/120 to geographically separate points at which a signal may be transmitted to, or received from, the UE 104. This may increase flexibility of using multiple-input, multiple-output and beamforming enhancements for communicating with the UE 104. The APs 116/120 may be used to transmit downlink transmissions to the UE 104 and receive uplink transmissions from the UE 104. In some embodiments, the distributed transmit/receive capabilities provided by the APs 116 and 120 may be used for coordinated multipoint or carrier aggregation systems from one or more base stations.

While the network environment 100 illustrates base station(s) 108 communicating with the UE 104 through APs 116/120, in various embodiments, the network environment 100 may include a number of other network elements (for example, base stations, TRPs, eNBs, etc.) to facilitate a radio access network connection for the UE 104.

The base station 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The APs 116 and one or more antenna panels on the UE 104 may include arrays of antenna elements that allow receive or transmit beamforming. Beamforming may improve the uplink and downlink budgets by determining and using uplink and downlink beams that increase antenna gain and overall system performance. The UE 104 and the base station 108 may determine desired uplink-downlink beam pairs using beam management operations based on reference signal measurements and channel reciprocity assumptions.

In the downlink direction, the base station 108 may send synchronization signal blocks (SSBs) and channel state information-reference signals (CSI-RSs) that are measured by the UE 104 to determine the desired downlink beam pair for transmitting/receiving physical downlink control channel (PDCCH) and physical downlink shared channel (PDSCH) transmissions. In some embodiments, the network elements may assume uplink/downlink beam correspondence and use the desired downlink beam pair as the desired uplink beam pair for physical uplink shared channel (PUSCH) and physical uplink control channel (PUCCH) transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, and later refinement of the uplink and downlink beams.

The base station(s) 108 may transmit, in PDCCH, downlink control information (DCI) to the UE 104 to schedule a data transmission. DCI corresponds to Physical (PHY) layer signaling. 3GPP has defined a number of DCI formats to accommodate particular PDCCH payloads. For example, DCI formats 1_0 and 1_1 may be used to provide resource allocations for a PDSCH, with DCI format 1_0 being considered a fallback DCI format that may be used to maintain a connection when coverage deteriorates. Other DCI format are also defined.

The DCI may allocate resource allocations in the frequency domain using various resource allocation types. The resource allocation types may include, for example, type-1, type-2, and dynamic switch resource allocations. In general, the type-0 resource allocation uses a bitmap allocation method, the type-1 resource allocation uses a starting resource block and number of resource blocks, and the dynamic switch is dynamically set to type-0 or type-1 by a DCI field.

The base station(s) 108 may use a radio network temporary identifier (RNTI) to scramble cyclic redundancy check (CRC) bits that are added to a payload of the DCI in order to address the DCI to a particular UE.

The base station(s) 108 may provide TCI state information to the UE 104 to indicate QCL relationships between antenna ports used for reference signals (for example, SSB or CSI-RS) and downlink data or control signaling, for example, PDSCH or PDCCH. As briefly introduced above, the base station(s) 108 may use a combination of RRC signaling, MAC CE signaling, and DCI to inform the UE 104 of these TCI states.

Initially, the base station(s) 108 may configure the UE 104 with a plurality of TCI states through RRC signaling. In some embodiments, up to 128 TCI states may be configured for PDSCH through, for example, a PDSCH-config information element (IE), and up to 64 TCI states may be configured for PDCCH through, for example, a PDCCH-config IE. Each TCI state may include a physical cell identifier (ID), a bandwidth part ID, an indication of the relevant SSB or CSI-RS, and an indication of the QCL type. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The TCI states may be set as inactive after initial configuration. The base station(s) 108 may then transmit an activation command through, for example, a MAC control element. The activation command may activate up to eight combinations of one or two TCI states that correspond to eight codepoints of a TCI field in DCI. One or more specific TCI states may then be dynamically selected and signaled using the TCI field in DCI to indicate which of the active TCI states are to be used for subsequent transmissions.

As described above, in a unified TCI framework, each TCI codepoint can be associated with a TCI for joint uplink and downlink beam indication or one or two TCIs for separate uplink and downlink beam indications. Further, to support multi-TRP operation, each TCI codepoint may be mapped to multiple TCI states the correspond to each TRP.

Figure 2:
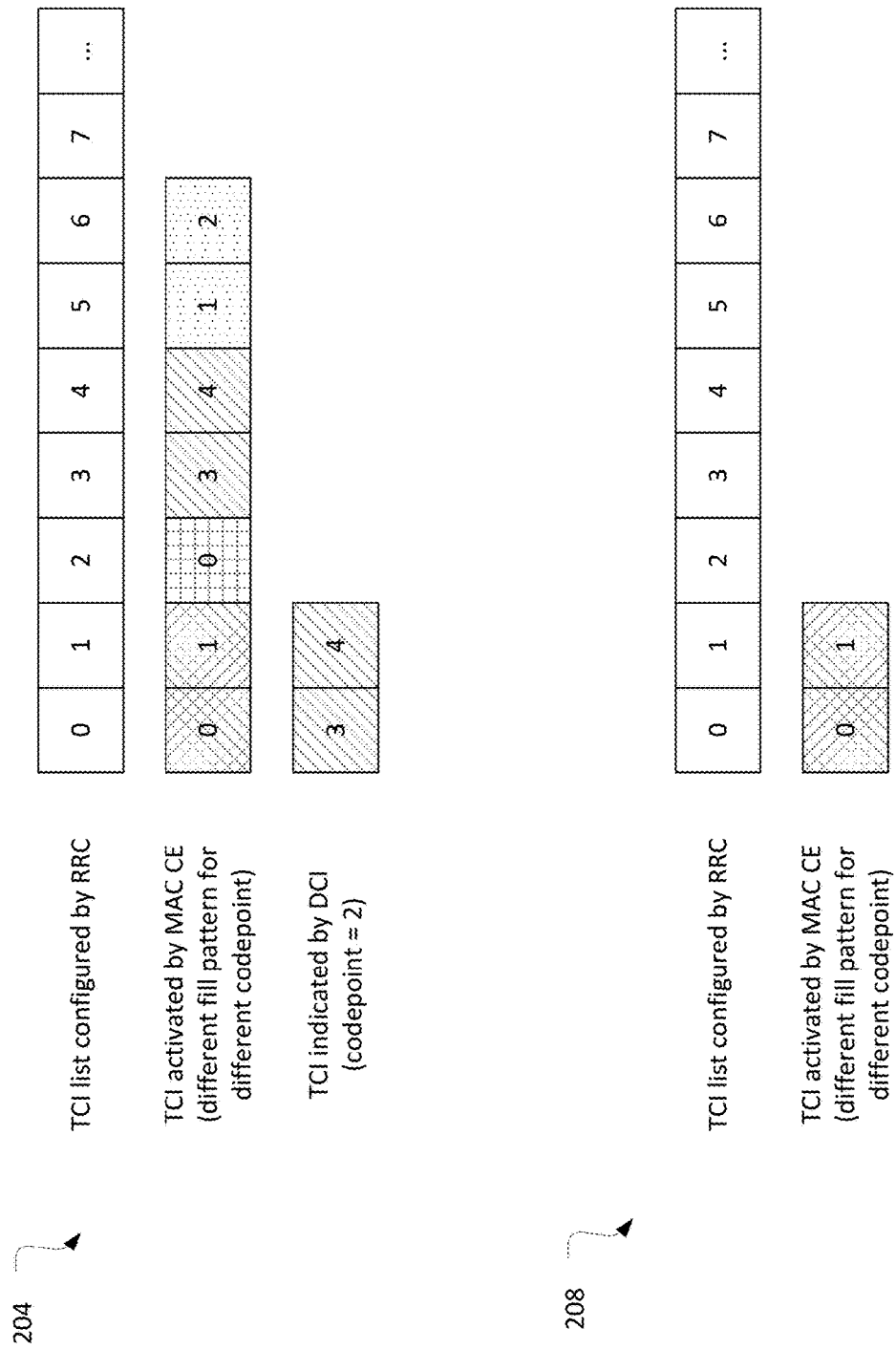
FIG. 2 illustrates two scenarios for signaling TCI state information in accordance with some embodiments.

FIG. 2 illustrates two scenarios for TCI state signaling in accordance with some embodiments. In scenario 204, the TCI state may be provided by a combination of DCI and MAC CE signaling. For example, the base station(s) 108 may configure the UE 104 with a TCI list using RRC signaling. Sometime thereafter, the base station(s) 108 may transmit a MAC CE to the UE 104 to activate a plurality of TCI states. One or more activated TCI states may correspond to each of a plurality of DCI codepoints. As shown, TCI states 0 and 1 may correspond to a first DCI codepoint (for example, codepoint=0); TCI state 0 may correspond to a second DCI codepoint (for example, codepoint=1); TCI states 3 and 4 may correspond to a third DCI codepoint (for example, codepoint=2); and TCI states 1 and 2 may correspond to a fourth DCI codepoint (for example, codepoint=3). At a later time, the base station(s) 108 may transmit DCI with a DCI codepoint value corresponding to the TCI states that should be applied to subsequent transmissions. As shown, DCI codepoint=2 may be transmitted to select TCI states 3 and 4.

In scenario 208, the TCI state may be provided by MAC CE signaling. For example, the base station(s) 108 may configure the UE 104 with a TCI list using RRC signaling similar to that described above. However, instead of the base station(s) 108 using a MAC CE to activate TCI states corresponding to a plurality of codepoints as described above, the MAC CE may only activate one or two TCI states that correspond to one codepoint. Therefore, in this embodiment, DCI signaling is not needed to indicate the TCI state(s) that should be applied to a subsequent transmission.

The TCI state signaling of scenarios 204 and 208 may be associated with challenges related to hybrid automatic repeat request-acknowledgment (HARQ-ACK) feedback and TCI state ambiguity between receipt of the MAC CE and receipt of the DCI.

Figure 3:
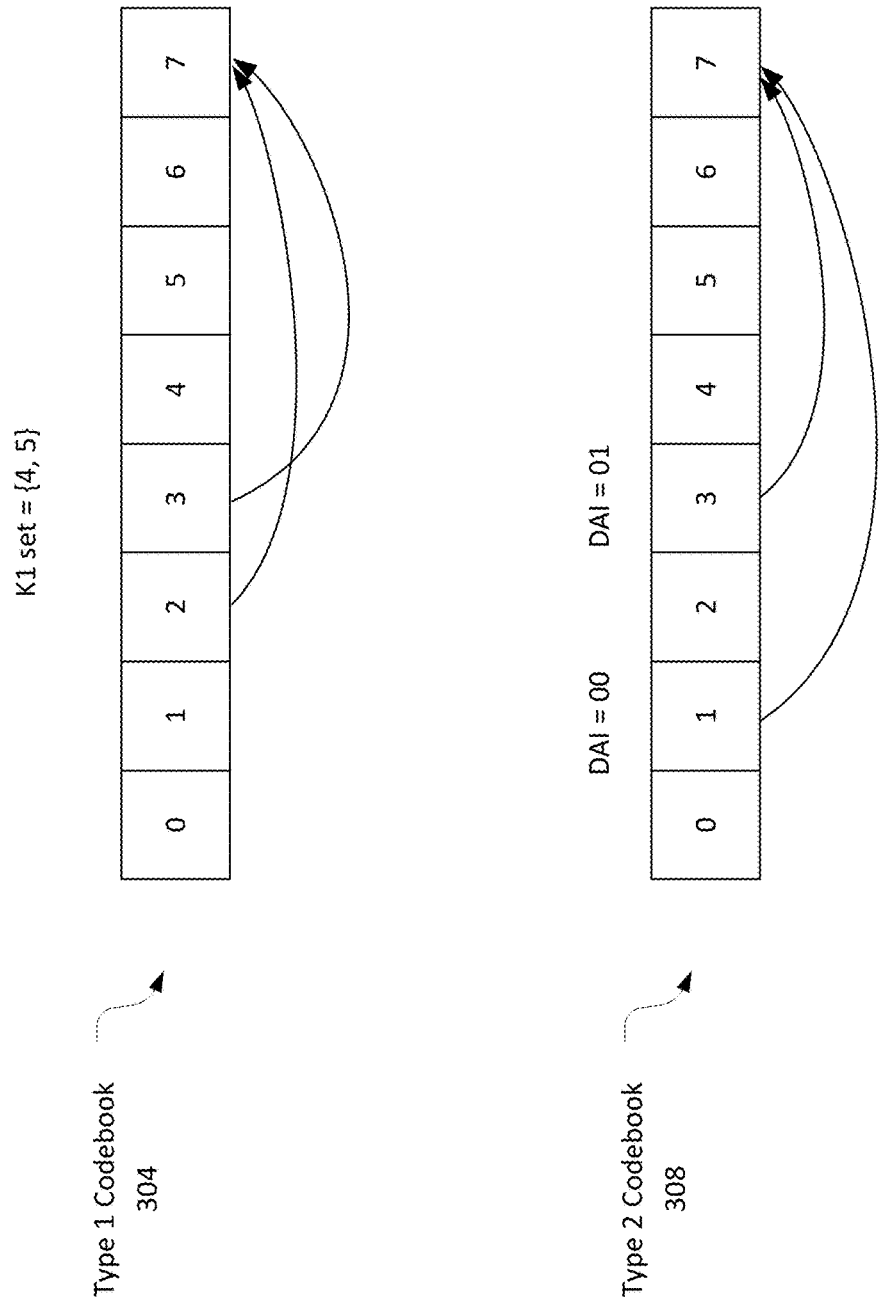
FIG. 3 includes signaling diagrams in accordance with some embodiments.

HARQ-ACK feedback is reported by PUCCH/PUSCH based on a HARQ codebook. FIG. 3 illustrates two types of HARQ codebooks that may be used in accordance with some embodiments. In particular, FIG. 3 illustrates a type-1 codebook 304 and a type-2 codebook 308 as used with respect to eight transmission slots, slots 0-7. The slots may include all downlink transmissions, all uplink transmissions, or a mix of uplink and downlink transmissions. In FIG. 3, slot 7 may include uplink transmissions to accommodate HARQ-ACK feedback transmitted from the UE 104 to the base station(s) 108.

The type-1 codebook 304 may correspond to a semi-persistent scheme in which the reported HARQ for corresponding downlink slots are configured. For example, the UE 104 may be configured with a K1 set of values that indicate delay(s) between a PDSCH and a corresponding HARQ. By default, the K1 set may be predefined. The base station(s) 108 may update the configuration of the K1 set by providing the UE 104 with appropriate configuration information. The UE 104 may use the values of the configured K1 set to determine the DL slots for which the HARQ-ACK feedback is to be transmitted in slot 7. For example, with respect to FIG. 3, the K1 set may include 4 and 5. Thus, the UE 104 may determine that ACK/NACK values corresponding to downlink transmissions in slots that precedes slot 7 by 4 and 5 slots are to be transmitted in slot 7. For example, ACK/NACK values corresponding to downlink transmissions in slot 2 (which is 5 slots before slot 7) and slot 3 (which is 4 slots before slot 7) are to be included in the HARQ-ACK feedback transmitted in slot 7.

The type-2 codebook 308 may correspond to a dynamic scheme in which the reported HARQ is based on a received downlink assignment index (DAI) that is indicated in a dynamic manner. The type-2 codebook may be indicated by, for example, a higher layer parameter pdsch-HARQACK-Codebook=dynamic. The DAI is an index that corresponds to the set of transmitted/scheduled downlink data that corresponds to one HARQ-ACK feedback. For the type-2 codebook, the DAI may include four bits if more than one serving cell are configured in the downlink, where the 2 most significant bits (MSBs) are the counter DAI and the 2 least significant bits (LSBs) are the total DAI; or two bits if only one serving cell is configured in the DL, where the two bits are the counter DAI.

As shown in FIG. 3, the DAI with the lowest value, 00, corresponds to slot 1, and the DAI having the next consecutive value, 01, corresponds to slot 3. These values may correspond to counter DAIs. Therefore, the UE 104 may know that the HARQ-ACK feedback transmitted in slot 7 is to include ACK/NACK values that correspond to downlink transmissions in slots 1 and 3.

A TCI-state action time (or simply, "action time" or "action delay") may be the time between transmitting an ACK related to a TCI update and updating the beam indicated by the TCI state. However, there may be some system ambiguity as to the occurrence of this ACK with respect to the TCI-state signaling scenarios 204 and 208 discussed above.

For example, with respect to signaling scenario 204, the UE 104 may send ACK/NACK for data based on type-1 or type-2 codebook. If the base station(s) 108 receives a NACK, it may not know whether the NACK is the result of the UE 104 failing to receive the subject downlink transmission (for example, the PDSCH) or failing to decode the PDCCH that schedules a downlink transmission. A NACK sent in response to improperly decoding the PDCCH may be referred to as a discontinuous transmission (DTX) feedback, which may sent by the UE 104 when uplink transmissions are suspended for period of time due to, for example, a pause in a normal flow of conversation.

If a base station(s) 108 receives an ACK, it knows that the TCI state information, which was transmitted by DCI in the PDCCH that schedules the subject downlink transmission, was properly received by the UE 104. However, if the base station(s) 108 receives a NACK, it is not able to determine whether it is based on failure to receive a PDSCH (for example, a true negative acknowledgement) or based on failing to decode a PDCCH (for example, a DTX). It is, therefore also not able to determine whether the TCI state information in the DCI was properly received by the UE 104. Thus, some embodiments may provide mechanisms to enable differentiation between NACK and DTX.

Signaling scenario 204 may also include ambiguity with respect to which TCI state is to be used after the UE 104 receives the MAC CE, but before the UE 104 receives the TCI information in the DCI.

With respect to signaling scenario 208, the UE 104 may send ACK/NACK for data and the base station(s) 108 may understand whether the MAC CE was decoded correctly or not based on the reported ACK/NACK. However, in some embodiments, the acknowledgment may be reported by multiple repetitions across slots. Therefore, there is ambiguity as to start point for the action time. This ambiguity may also exist with respect to signaling scenario 204.

Various embodiments described herein address these challenges.

There may be two options for NACK/DTX differentiation. In option 1, a restriction may be added such that DCI that indicates a new TCI state does not also schedule downlink data transmissions. Thus, when the UE 104 reports ACK/NACK for this DCI, an ACK unambiguously indicates proper receipt of the TCI state information, while a NACK unambiguously indicates that the TCI state information was not received. In option 2, the DCI that indicates a new TCI may also schedule downlink data, but the UE 104 may also report additional information to facilitate differentiation between NACK and DTX. These options will be described in further detail below.

Option 1 may be associated with three suboptions. Unless otherwise indicated, these suboptions may be used independently or in any combination with one another.

In a first suboption, option 1-1, DCI that includes TCI state information may be associated with a new RNTI. In some embodiments, the new RNTI may be referred to as TCI Information (TI)-RNTI; however, such naming convention is not restrictive to embodiments. The TI-RNTI may be used to scramble CRC bits of the DCI. When the UE 104 determines the DCI is associated with the TI-RNTI, by determining the TI-RNTI can be used to successfully descramble the CRC bits, it may determine that the DCI is of a type that provides TCI information, but does not schedule downlink data. Fields of the DCI of option 1-1 that are used to schedule data, for example, frequency domain resource allocation (FDRA) field, may be set to all zeros or repurposed for another function.

In a second suboption, option 1-2, the DCI that includes TCI state information can be associated with a legacy RNTI, for example, cell-RNTI (C-RNTI) or modulation and coding scheme-C-RNTI (MCS-C-RNTI), with one or more fields having a value set to indicate that the DCI is to carry TCI information and does not schedule downlink data. These field/values may be HARQ process number set equal to zero; redundancy version (RV) field set equal to zero; modulation and coding scheme (MCS) set equal to one; a frequency domain resource assignment (FDRA) field set to all zeros for a type-0 resource allocation or a dynamic-switch resource allocation; or to all ones for a type-1 resource allocation. These field/values may correspond to restrictions for a semi-persistent scheduling (SPS) release; however, the SPS release is carried by DCI associated with a configured scheduled-RNTI (CS-RNTI), rather than C-RNTI or MCS-C-RNTI.

In a third sub-option, option 1-3, the DCI that includes TCI state information can be associated with CS-RNTI with some or all of the following restrictions based on the restriction for SPS release but with different predefined values. For example, the HARQ process number field may be set equal to one; the RV field may be set equal to 1; the MCS field may be set to 0; or the FDRA field may be set to all 0 four type-0 resource allocation or a dynamic switch resource allocation type (for example, resourceAllocation=dynamicSwitch), or to all ones for type-1 resource allocation.

The field restrictions used in options 1-2 and 1-3 to indicate that the DCI is used for TCI information and not data scheduling are some non-limiting examples. In other embodiments, restrictions for other fields or elements in DCI may be used for this purpose.

In some embodiments, if only option 1 is enabled, the UE 104 may ignore a TCI indication in a normal DCI (for example, a DCI that is not used to provide TCI information) as those values are not used to provide a TCI update. In other embodiments, the values of a TCI field in a DCI that is not used to provide TCI information may be used for other functionalities. For example, a predefined value may be indicated for the TCI field that can be used for DCI decoding validation.

In some embodiments, a DCI that is used to updated TCI information may not include a TCI indication field. For example, an RRC reconfiguration message may have a TCIPresentInDCI indication that is not enabled. In these embodiments, a different, unused field may be used to provide the TCI indication. For example, in some embodiments, an antenna port field in DCI may be used to provide the TCI indication.

Providing the additional information in the DCI as described with respect to the suboptions of option 1, may enable the base station(s) 108 to determine that a NACK was received based on the PDCCH not being properly decoded and, therefore, the TCI information was not successfully conveyed to the UE 104.

Figure 4:
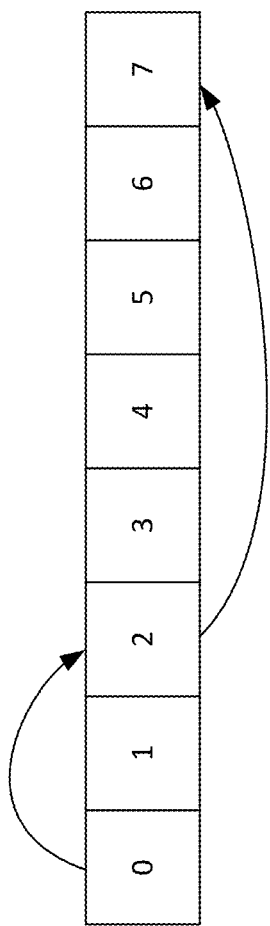
FIG. 4 includes another signaling diagram in accordance with some embodiments.

FIG. 4 illustrates a signaling diagram 400 for transmitting HARQ-ACK feedback in accordance with some embodiments. For options 1-1, 1-2, and 1-3, the HARQ feedback for type-1 codebook may be determined by a time domain resource (TDRA) value in a DCI that includes a TCI update. For example, DCI in slot 0 may include a TDRA value that identifies slot 2 as a virtual downlink slot. Slot 2 may be considered a virtual downlink slot because it does not actually include downlink data. Rather, slot 2 is used to provide the timing for transmitting HARQ-ACK feedback that indicates whether the DCI (and TCI update) was correctly received in slot 0. As shown, the UE 104, configured with a K1 set that includes a value of 5, may determine that the HARQ-ACK feedback transmitted in slot 7 corresponds to the virtual data of slot 2. Thus, by virtue of the TDRA linking slots 0 and 2 and the K1 set linking slots 2 and 7, the base station(s) 108 will understand that the HARQ-ACK feedback transmitted in slot 7 corresponds to the DCI transmitted in slot 0.

Recall that in the second option for NACK/DTX differentiation, option 2, the DCI used to indicate the TCI update may also schedule downlink data. In this option, the HARQ feedback may further include additional information to differentiate NACK/DTX. Option 2 may include five suboptions. Unless otherwise indicated, these suboptions may be used independently or in any combination with one another.

In a first suboption, option 2-1, X bits may be added to a HARQ codebook to indicate whether the UE 104 receives the indication of the TCI update. The value X may indicate a maximum number of TCI updates corresponding to one HARQ report.

Figure 5:
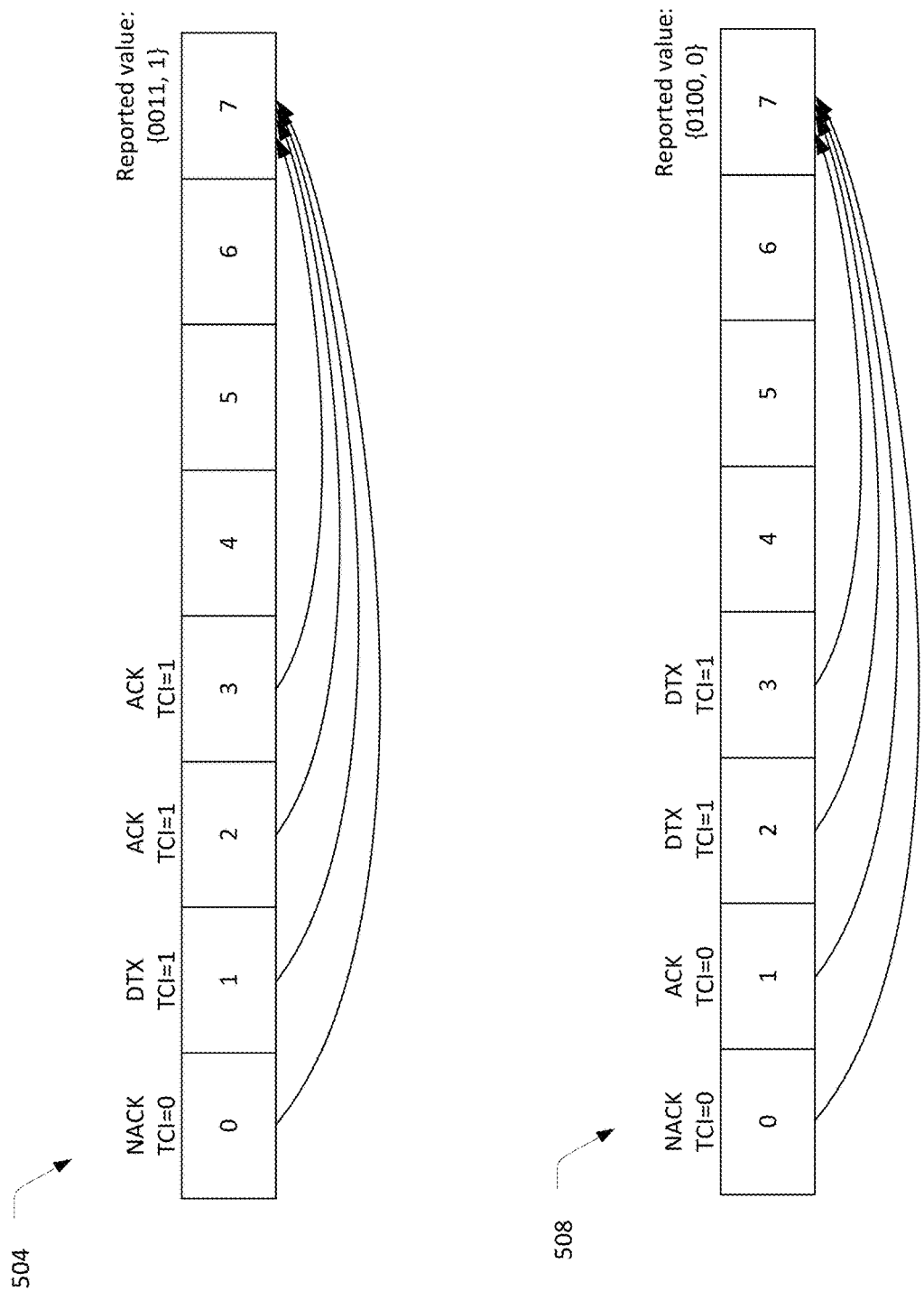
FIG. 5 includes other signaling diagrams in accordance with some embodiments.

FIG. 5 illustrates signaling diagrams 504 and 508 to demonstrate the HARQ reporting procedures of option 2-1 in accordance with some embodiments.

In signaling diagram 504, slots 0-3 are the subject of HARQ feedback in slot 7. In slot 0, the TCI state may be set to TCI 0. The UE 104 may determine that a downlink transmission is not successfully received in slot 0 and, therefore, provide a NACK corresponding to slot 0. In slot 1, the TCI state may be updated to TCI 1. The UE 104 may determine that a downlink transmission is not successfully received in slot 1 due to improperly decoding a PDCCH that schedules the downlink transmission in slot 1 and, therefore, provide a DTX corresponding to slot 1. In slots 2 and 3, the UE 104 may determine that downlink transmissions are successfully received and may, therefore, provide ACKs corresponding to those two slots. The UE 104 may also successfully receive a TCI update in DCI that corresponds to one of the slots 0-3. It may be noted that even though the UE 104 failed to decode the PDCCH in slot 1 and, therefore, did not receive the first TCI update, it may still receive the TCI update from slot 2 (and 3). The reported values in the HARQ feedback for slots may include a reported value of {0011, 1}, with the first four bits corresponding to the NACK, DTX, ACK, and ACK of slots 0-3 and the fifth bit indicating that the UE 104 successfully received the TCI update.

In signaling diagram 508, slots 0-3 are again the subject of HARQ feedback in slot 7. In this diagram, the TCI state may be updated from TCI 0 to TCI 1 in slot 2. The UE 104 may determine that a downlink transmission is not successfully received in slot 0 and, therefore, provide a NACK corresponding to slot 0. In slot 1, the UE 104 may determine that downlink transmission is successfully received and may, therefore, provide an ACK corresponding to slot 1. In slot 2 and 3, the UE 104 may determine that the downlink transmissions are not successfully received due to improperly decoding PDCCHs that schedule the downlink transmissions in slots 2 and 3 and, therefore, provide DTXs corresponding to slots 2 and 3. The UE 104 may also determine that no TCI update was received in DCI that corresponds to any of slots 0-3. Thus, even though a TCI update was attempted in slot 2, it was not successfully received by the UE 104 in that slot or any later slots. The reported values in the HARQ feedback for the slots may be {0100, 0}, with the first four bits corresponding to the NACK, ACK, DTX, and DTX of slots 0-3 and the fifth bit indicating that the UE 104 did not receive a TCI update.

In both signaling diagrams 504 and 508, X is one bit, which indicates that only one TCI update may be performed corresponding to the HARQ report. In other embodiments, X may be other numbers providing for other number of TCI updates.

For example, in one option, X may equal a number of bands or band groups, which assumes only one TCI update is allowed within the DL slots corresponding to the HARQ report. That is, one TCI update in DCI can update the beams for a band or band group. In another option, X may equal twice the number of bands or band groups, which assumes only one UL TCI update and one DL TCI update is allowed within the DL slots corresponding to a HARQ report. In yet another option, X may be equal to a number of TCI codepoints multiplied by a number of bands or band groups. In this option, the UE 104 may report the latest TCI in the detected TCI codepoint in the HARQ-ACK. For example, if the UE 104 is configured with carrier aggregation from M bands, the UE 104 can report M additional bits in HARQ-ACK, where bit k indicates whether a TCI update for band k is received. In another example, if the UE 104 is configured with carrier aggregation from M bands, the UE 104 can report M*N additional bits in HARQ-ACK, where every N bits indicates the latest decoded TCI codepoint for a corresponding band.

Setting X to one (meaning a single TCI indication across all component carriers) or two (meaning only one UL TCI update and one DL TCI update across all component carriers) may appear restrictive. However, it may be noted that the base station(s) 108 always has the flexibility to indicate HARQ-ACK in a different slot. Thus, while limiting X to one or two may have some minor latency impact, it may also save significant DCI overhead.

In some embodiments, the base station(s) 108 may configure the UE 104 to select one of the above-described options with respect to the value and interpretation of X. By doing so, the base station(s) may control the trade-off between overhead and flexibility to provide desired operations for a particular network environment.

Figure 6:
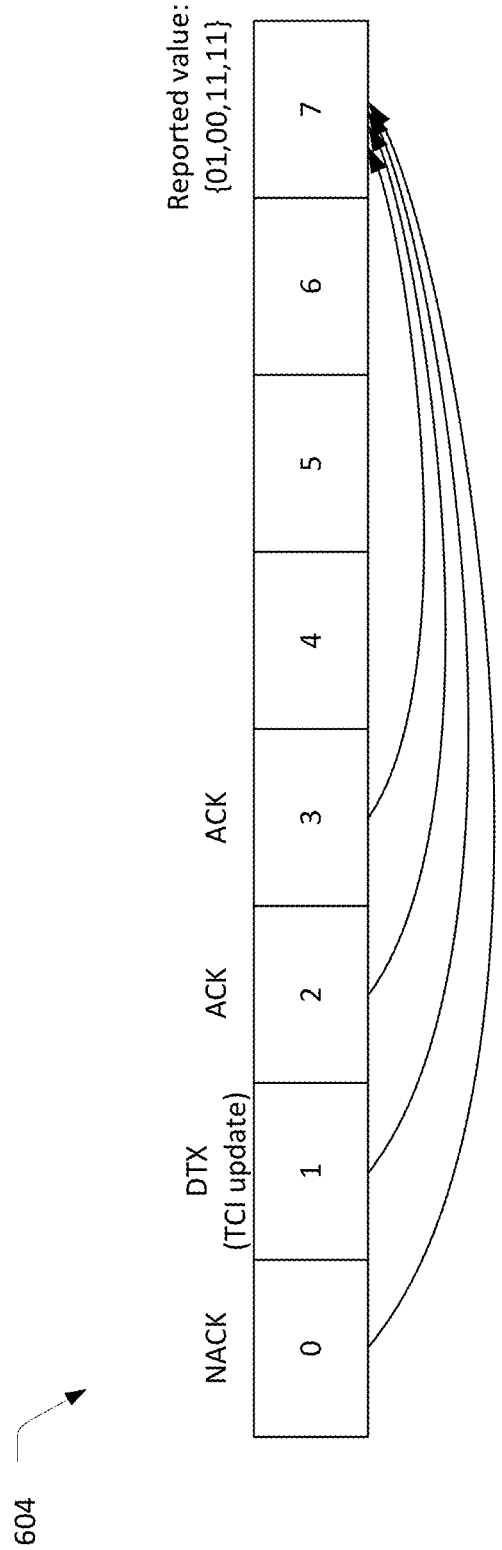
FIG. 6 includes another signaling diagram in accordance with some embodiments.

In a second suboption, option 2-2, each ACK/NACK value may be accompanied by one additional bit to report whether DCI is properly decoded. FIG. 6 illustrates a signaling diagram 600 to demonstrate HARQ reporting procedures of option 2-2 in accordance with some embodiments.

In signaling diagram 600, slots 0-3 are the subject of HARQ feedback in slot 7. In slot 0, the UE 104 may determine that a downlink transmission is not successfully received and, therefore, provide a NACK corresponding to slot 0. In slot 1, the UE 104 may determine that a downlink transmission is not successfully received due to improperly decoding a PDCCH that schedules the downlink transmission. Therefore, the UE 104 may provide a DTX corresponding to slot 1. In slots 2 and 3, the UE 104 may determine that downlink transmissions are successfully received and may, therefore, provide ACKs corresponding to those two slots.

The reported values in the HARQ feedback for slots 0-3 may include four sets of values corresponding to the four slots. The first value of a set may be the ACK/NACK value to indicate whether a PDSCH was successfully received. The second value of the set may indicate whether DCI was properly decoded. The HARQ feedback corresponding to slot 0 may include '01' to indicate the PDSCH was not successfully received and the DCI scheduling that PDSCH was properly decoded. The HARQ feedback corresponding to slot 1 may include '00' to indicate that the PDSCH was not successfully received and the DCI scheduling that PDSCH was not properly decoded. So even though the base station(s) 108 attempted to update the TCI, using DCI that corresponding to slot 1, the second value of the HARQ feedback corresponding to slot 1 will provide an indication that the TCI update was not received. The HARQ feedback corresponding to slots 2 and 3 may include '11' to indicate that both the PDSCH and the DCI were properly received and decoded.

In a further extension to option 2-2, one single codeword transmission may be allowed for each DCI. Thus, a bit reserved for the second codeword can be used for PDCCH decoding status report. The UE 104 may report 2 bits per DCI, where the first bit indicates the HARQ-ACK for the single codeword, and the second bit indicates the HARQ-ACK for PDCCH.

In some embodiments, if the UE 104 is configured with two transport block (TB) transmission, there may be two bits corresponding to each DCI. If the DCI schedules data and indicates a TCI change, a restriction may be introduced such that only a single TB can be scheduled. This may allow the other bit to be used for the HARQ-ACK indication of whether the TCI indication was properly received.

In a third suboption, option 2-3, for type-2 HARQ codebook, additional bits may be reported for DCI to indicate that the UE 104 detects the TCI update. The additional bit may be considered as a HARQ-ACK report corresponding to a DAI. The number of additional bits, X, in this case may be determined by a maximum number of transport blocks, N, for example, X=N. The base station(s) 108 may increase a total DAI (if present) by two for the DCI indicating a TCI update and populate counter DAI and total DAI for the next DCI properly (for example, by increasing counter DAI by two).

Figure 7:
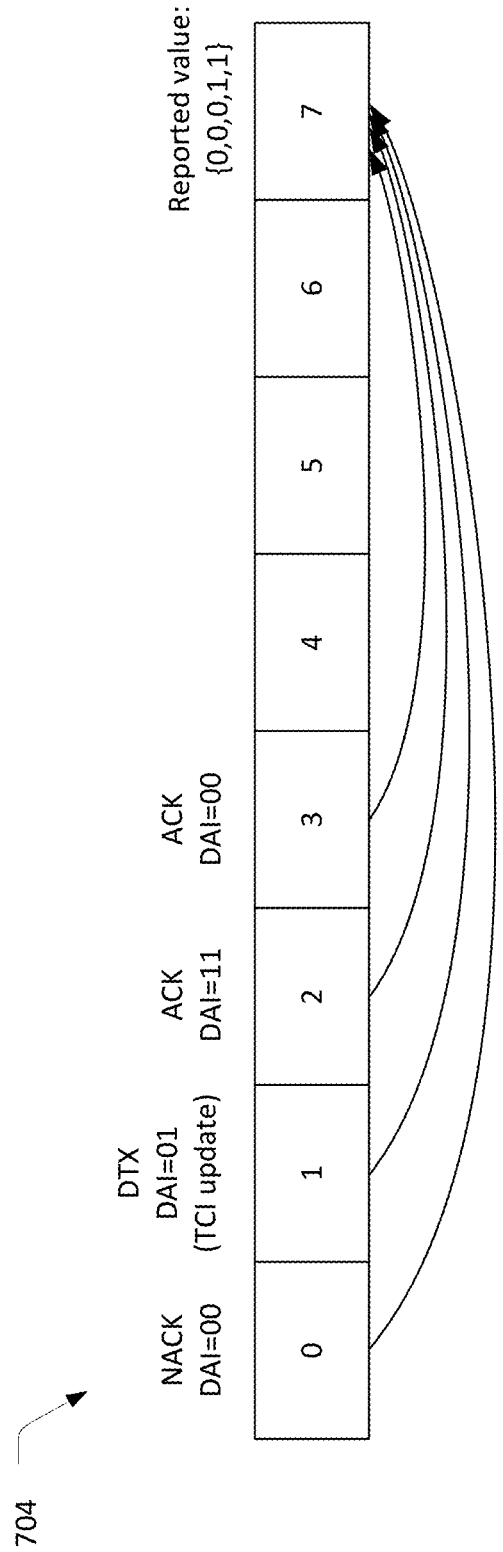
FIG. 7 is another signaling diagram in accordance with some embodiments.

FIG. 7 illustrates a signaling diagram 700 to demonstrate HARQ reporting procedures of option 2-3 in accordance with some embodiments. In the signaling diagram 700, slots 0-3 are the subject of HARQ feedback in slot 7. In slot 0, the UE 104 may determine that a downlink transmission is not successfully received and, therefore, provide a corresponding NACK. In slot 1, the UE 104 may determine that a downlink transmission is not successfully received due to improperly decoding a PDCCH that schedules the downlink transmission and, therefore, provide a corresponding DTX. In slots 2 and 3, the UE 104 may determine that downlink transmissions are successfully received and, therefore, provide corresponding ACKs.

The DCIs that schedule the downlink transmissions may indicate counter DAIs of: '00' for slot 0; '01' for slot 1; '11' for slot 2; and '00' for slot 3. As noted above, DCI having a TCI update may be associated with its own DAI. So, in this embodiment, the DAI skipped in the sequence above, that is, DAI '10,' may correspond to the DCI used to provide the TCI update. Thus, the reported values of the HARQ feedback may include, in order, a 0 to indicate NACK of slot 0 (corresponding to DAI '00'); a 0 to indicate DTX of slot 1 (corresponding to DAI '01'); a 0 to indicate that the DCI used to provide the TCI update was not properly received (corresponding to DAI '10'); a 1 to indicate the ACK of slot 2 (corresponding to DAI '11'); and a 1 to indicate the ACK of slot 3 (corresponding to DAI '00').

In a fourth sub-option, option 2-4, the base station(s) 108 may use DCI that includes a TCI update to also trigger an aperiodic SRS. The base station(s) 108 may then determine whether the DCI is detected based on a receipt/detection of the SRS.

Figure 8:
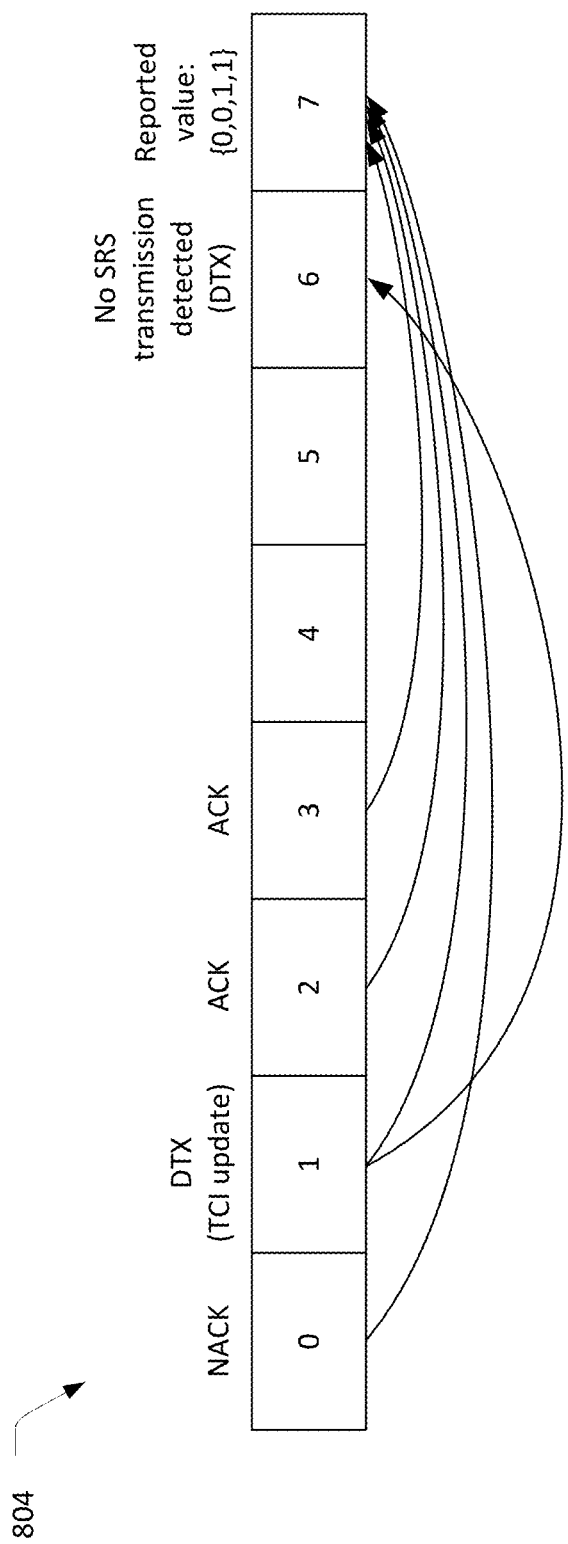
FIG. 8 is another signaling diagram in accordance with some embodiments.

FIG. 8 illustrates a signaling diagram 800 to demonstrate reporting procedures of option 2-4 in accordance with some embodiments. In the signaling diagram 800, slots 0-3 are the subject of HARQ feedback in slot 7. In slot 0, the UE 104 may determine that a downlink transmission is not successfully received and, therefore, provide a corresponding NACK. In slot 1, the UE 104 may determine that a downlink transmission is not successfully received due to improperly decoding a PDCCH that schedules the downlink transmission and, therefore, provide a corresponding DTX. In slots 2 and 3, the UE 104 may determine that downlink transmissions are successfully received and, therefore, provide corresponding ACKs. The reported values in the HARQ report may, therefore, be set as {0, 0, 1, 1}.

If the DCI that schedules the transmission in slot 1 also includes an aperiodic SRS trigger, the base station(s) 108 would expect to receive the SRS transmission in slot 6. If an SRS transmission in slot 6 is not detected, the base station(s) will know that the DCI was not properly decoded. Therefore, the reported NACK for the corresponding DCI can be considered as a DTX. If an SRS transmission in slot 6 is detected, the base station(s) 108 will know that the DCI was properly decoded and the NACK indicates the PDSCH was not properly received (for example, the NACK can be considered a NACK). By knowing the DCI was properly decoded, the base station(s) 108 may also know that the TCI update was successful.

In a fifth suboption, option 2-5, the reported NACK may always be considered as a DTX. Thus, if the base stations(s) 108 receives a NACK, it may assume that the PDCCH was not properly decoded and any TCI update was not properly received. In some instances, the base station(s) 108 may then repeat the TCI update in a subsequent transmission.

Whether case 1 (TCI provided by DCI and a MAC CE) or case 2 (TCI indication provided by MAC CE), if the HARQ-ACK is reported by multiple slots with repetition, the starting point for the action delay calculation may be determined in a number of different ways. For example, the starting point may be the slot having the first or last repetition of the HARQ-ACK. In other embodiments, the starting point may be determined by a slot with repetition Y, where Y is reported by a UE capability or is configured by signaling such as, for example, RRC, MAC CE, or DCI.

In some embodiments, for case 1, the slot of an aperiodic SRS transmission that is triggered by DCI having a TCI update may be additionally/alternatively used to determine the action delay. For example, the starting point may be determined by the aperiodic transmission slot only, or determined based the earlier of the aperiodic transmission slot and the HARQ-ACK slot. In the event that SRS is transmitted in multiple slots, the starting point may be the slot having the first or last repetition or by slot with repetition Y, similar to that described above with respect to the HARQ-ACK reporting.

It may be noted that the total action delay may be counted based on the starting point in the processing delay in both the base station(s) 108 and the UE 104. This may be predefined or reported by UE capability. Additionally/alternatively, this may be configured by higher-layer signaling. In some embodiments, the processing delay may be the same or different for HARQ-ACK and SRS.

In case 1, in which the TCI indication is provided by MAC CE and DCI, there may be ambiguity as which TCI state to use after the MAC CE is received but before the DCI indication. Therefore, embodiments provide two options for a default TCI assumption after a MAC CE configuring more than one TCI codepoint is received and before the DCI indication selecting one of the TCI codepoints.

In a first option, the TCI state(s) corresponding to the lowest TCI codepoint may be applied as a default TCI. In some scenarios, the lowest TCI codepoint may only be associated with a downlink or uplink TCI. This may lead to uncertainty as to which TCI is to be used for the other transmission direction. The following suboptions are provided with respect to first option.

In a first suboption, option 1-1, the TCI codepoint that is only associated with DL or UL TCI may not be used as the default TCI. Instead, for example, the UE 104 may use the lowest TCI codepoint that includes TCI for both DL and UL.

In a second suboption, option 1-2, the TCI codepoint that is only associated with DL or UL TCI may be used, and the UE 104 may only change the corresponding DL or UL TCI. The UE 104 may continue to use an old TCI for the other transmission direction. For example, if the default TCI codepoint is associated with a DL TCI, the UE 104 may use that DL TCI and may continue to use an old UL TCI.

In a third suboption, option 1-3, the TCI codepoint that is only associated with DL or UL TCI may be used and the next lowest TCI codepoint corresponding to a different type of TCI (for example, TCI associated with the other transmission direction) can be used. For example, if the default TCI codepoint is associated with a DL TCI, the UE 104 may find the next lowest TCI codepoint having a UL TCI.

In a fourth suboption, option 1-4, if the lowest TCI codepoint is only associated with a DL or UL TCI, this may be considered an error case.

In a second option for providing a default TCI assumption after a MAC CE and before the DCI indication, the default TCI may be determined by an action delay for the TCI(s) corresponding to each TCI codepoint configured by the MAC CE. The action delay may be determined by whether TCI is active/inactive or known/unknown. A TCI may be considered active if it is used for a particular channel. A TCI may be considered known if the UE 104 provides a measurement report, for example a layer 1-reference signal receive power (L1-RSRP) report within a predetermined time window prior to the TCI update signaling. For example, if a TCI is active or known, the UE 104 may be able to switch to a beam associated with the selected TCI state faster, thereby requiring less action delay.

If one TCI codepoint indicates a plurality of TCIs there may also be a plurality of action delays that may be used as basis for selecting the default TCI(s). In some embodiments, the smallest action delay of a TCI codepoint may be used in the selection of the default TCI(s). In other embodiments, the largest action delay of a TCI codepoint may be used in the selection of the default TCI(s).

In this manner, the action delay may be used to define priority of TCI states in the default selection. If more than one TCI states are associated with the same priority, the first option (for example, using lowest TCI codepoint) may be used. Alternatively, the first option may be modified such that the lowest TCI codepoint having known or active TCIs is selected.

Figure 9:
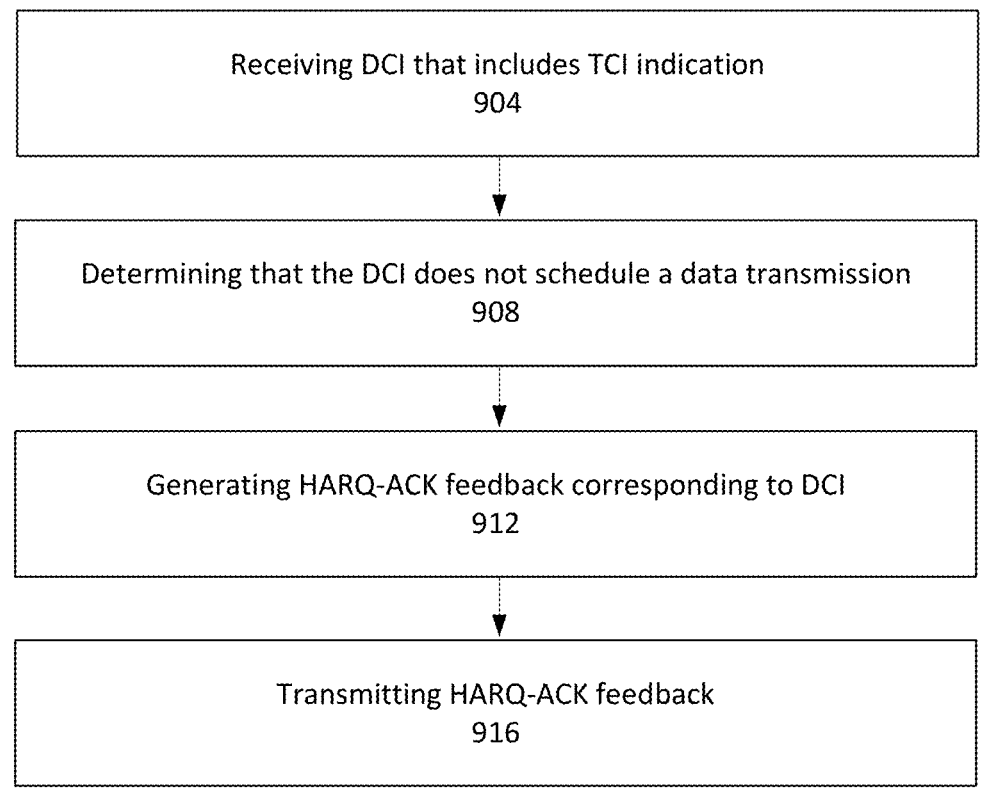
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by a UE such as, for example, UE 104 or UE 1300; or components thereof, for example, baseband processor 1304A.

The operation flow/algorithmic structure 900 may include, at 904, receiving DCI that includes a TCI indication. The TCI indication may instruct the UE 104 to update TCI state(s) by selecting a TCI codepoint from the plurality of TCI codepoints previously activated by a MAC CE. In some embodiments, the TCI indication may include up to three bits to indicate one of up to eight activated TCI codepoints.

The operation flow/algorithmic structure 900 may further include, at 908, determining that the DCI does not schedule a data transmission. In some embodiments, the determination at 908 may be based on an RNTI that is used to scramble CRC bits of the DCI. For example, a newly defined RNTI such as a TI-RNTI may provide an indication that this type of DCI does not schedule data. The FDRA field in this DCI may also be set to all zeros.

In another embodiment, the determination at 908 may be additionally/alternatively based on the values of one or more fields of the DCI. For example, it may be determined that the DCI does not schedule a data transmission if the DCI is associated with C-RNTI or MCS-C-RNTI and: the HARQ process number is set equal to zero; the RV is set to zero; the MCS is set to one; the FDRA is set to all zeros for type-0 resource allocation or a dynamic switch resource allocation; or the FDRA is set to all ones for type-1 resource allocation. For another example, it may be determined that the DCI does not schedule a data transmission if the DCI is associated with CS-RNTI and: the HARQ process number is set to one; the RV is set to one; the MCS is set to zero; the FDRA is set to all zeros for type-0 resource allocation or dynamic-switch resource allocation; or the FDRA is set to all ones for type-1 resource allocation.

The operation flow/algorithmic structure 900 may further include, at 912, generating HARQ-ACK feedback corresponding to the DCI. If the DCI is properly received, the HARQ-ACK feedback may include '1' bit value to indicate an ACK. If the DCI is not properly received, the HARQ-ACK feedback may include a '0' bit value to indicate a DTX. The HARQ-ACK feedback may be associated with the DCI based on a slot associated with the DCI. For example, even though the DCI does not schedule a data transmission, for purposes of HARQ-ACK timing/indication, the DCI may be associated with a slot, which, as described above, may be considered as a virtual DL slot. The DCI may be associated with the slot based on TDRA value within the DCI. The virtual DL slot may be associated with the slot in which the HARQ-ACK feedback is transmitted based on a K1 value configured to the UE 104.

While the HARQ-ACK feedback is described above to include ACK/NACK bits associated with the DCI, it may include additional bits associated with downlink transmissions scheduled by other DCI in other slots.

The operation flow/algorithmic structure 900 may further include, at 916, transmitting the HARQ-ACK feedback. The HARQ-ACK feedback may be transmitted in a slot associated with the DCI/virtual DL slot.

Figure 10:
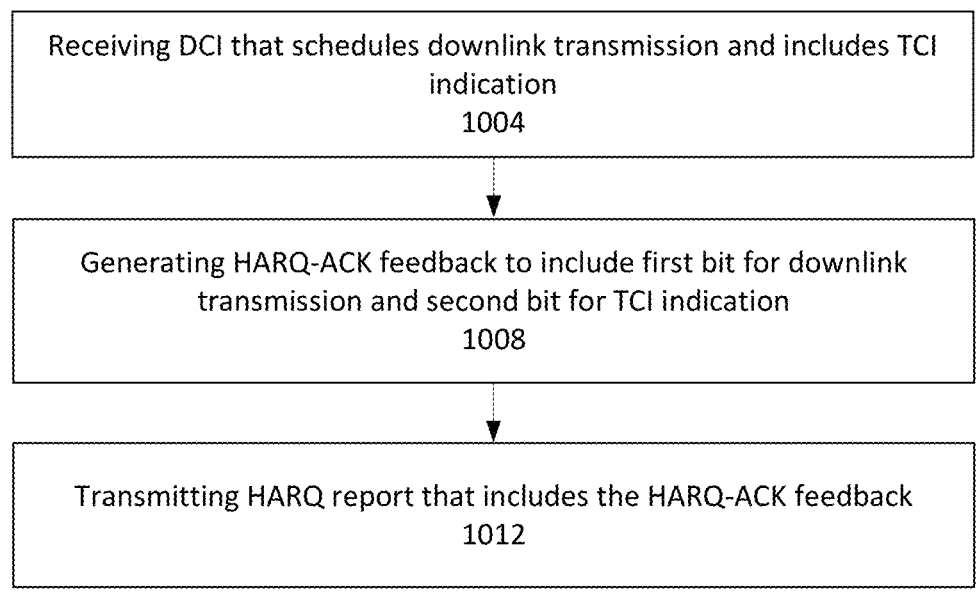
FIG. 10 illustrates another operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a UE such as, for example, UE 104 or UE 1300; or components thereof, for example, baseband processor 1304A.

The operation flow/algorithmic structure 1000 may include, at 1004, receiving DCI that schedules a downlink transmission and includes a TCI indication to update TCI state(s).

The operation flow/algorithmic structure 1000 may further include, at 1008, generating HARQ-ACK feedback to include a first bit for the downlink transmission and a second bit for the TCI indication. In some embodiments, the HARQ-ACK feedback may include a plurality of first bits corresponding to downlink transmissions in a corresponding plurality of slots. The HARQ-ACK feedback may also include one or more second bits (for example, X bits as described above) based on how many TCI updates are allowed within the plurality of slots as well as a number of bands, band groups, or TBs. In some embodiments, the value of X may be provided to the UE from a base station in configuration information.

In some embodiments, a pair of ACK/NACK bits may correspond to each slot associated with a HARQ report. The first bit may indicate whether a downlink transmission in an associated slot was successfully received, while the second bit may indicate whether a DCI that schedules the downlink transmission was successfully received. The order of the bits may be reversed in other embodiments. In this manner, the base station may be provided with sufficient information to determine whether a scheduling DCI and, therefore, a TCI update, was properly received by a UE.

The operation flow/algorithmic structure 1000 may further include, at 1012, transmitting the HARQ report with the feedback. The HARQ report may be transmitted based on timing information associated with a type-1 or a type-2 HARQ codebook.

Figure 11:
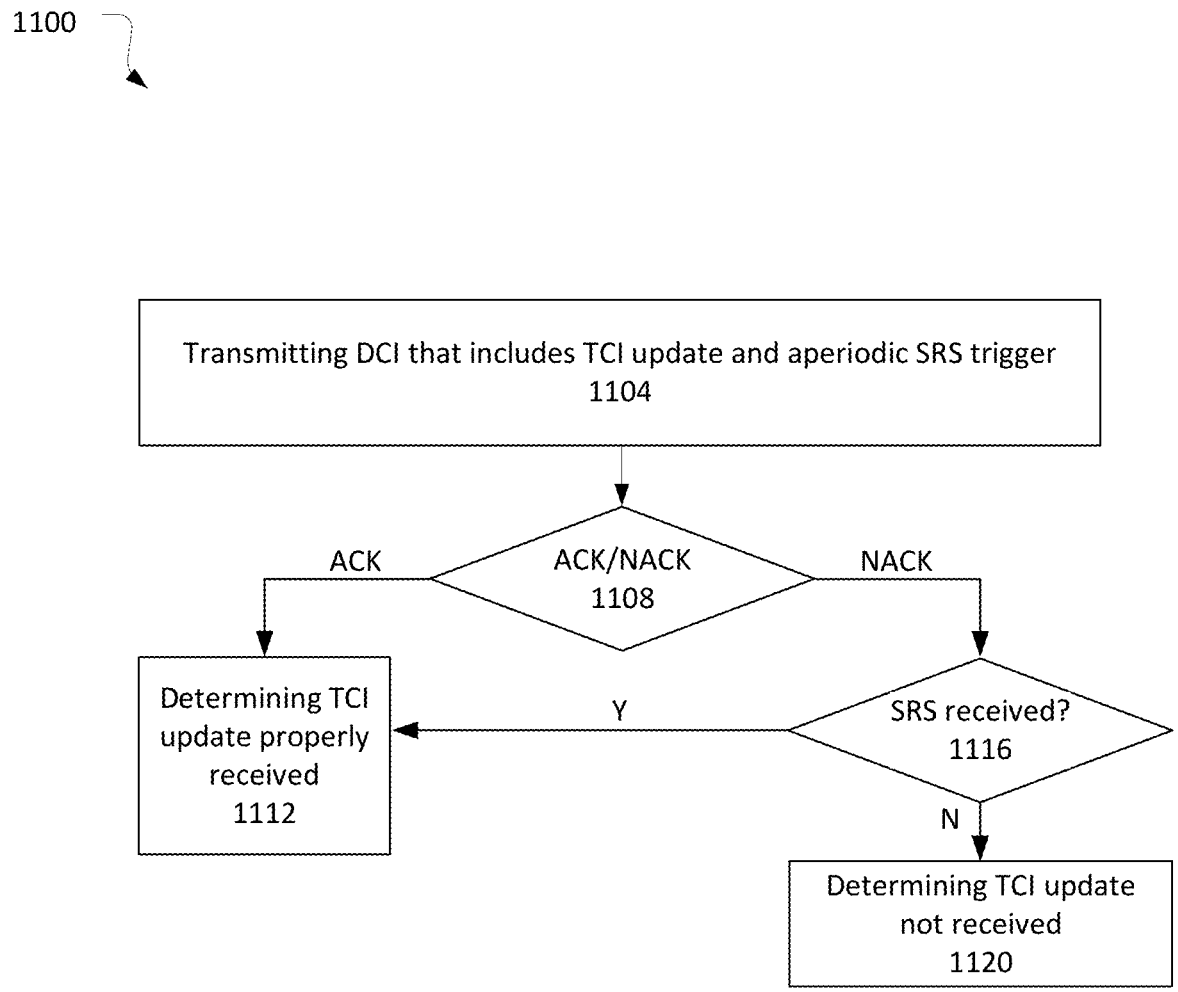
FIG. 11 illustrates another operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a base station such as, for example, base station(s) 108 or gNB 1400; or components thereof, for example, baseband processor 1404A.

The operation flow/algorithmic structure 1100 may include, at 1104, transmitting a DCI to a UE. The DCI may include a TCI update and an aperiodic SRS trigger. The DCI may also schedule a downlink transmission in a slot or otherwise be associated with the slot.

The operation flow/algorithmic structure 1100 may further include, at 1108, determining whether HARQ ACK feedback corresponding to the DCI/slot includes an ACK or NACK.

If it is determined, at 1108, that the HARQ ACK feedback includes an ACK, the operation flow/algorithmic structure 1100 may advance to determining, at 1112, that the TCI update was properly received. The ACK may indicate that the downlink transmission in the slot was successfully received and, therefore, the DCI that scheduled the downlink transmission must have also been successfully received. In this manner, the base station may determine that the UE has received the TCI update that was included in the DCI.

If it is determined, at 1108, that the HARQ ACK feedback includes a NACK, the base station may need additional information to determine whether the NACK is because only the downlink transmission in the slot was not successfully received or whether both the scheduling DCI and the scheduled downlink transmission were not successfully received. Thus, if a NACK is received at 1108, the operation flow/algorithmic structure 1100 may advance to determining whether the aperiodic SRS was received at block 1116.

If the SRS was received by the base station, the operation flow/algorithmic structure 1100 may advance to determining the TCI update was properly received at 1108. If the SRS was received, the base station will know that the SRS trigger (and the TCI update) in the DCI was effectively communicated to the UE.

If the SRS is not received by the base station, the operation flow/algorithmic structure 1100 may advance to determining the TCI update was not received at 1120. If the SRS was not received, the base station will know that the UE did not receive the SRS trigger in the DCI. The base station may then resend the TCI update if desired.

Figure 12:
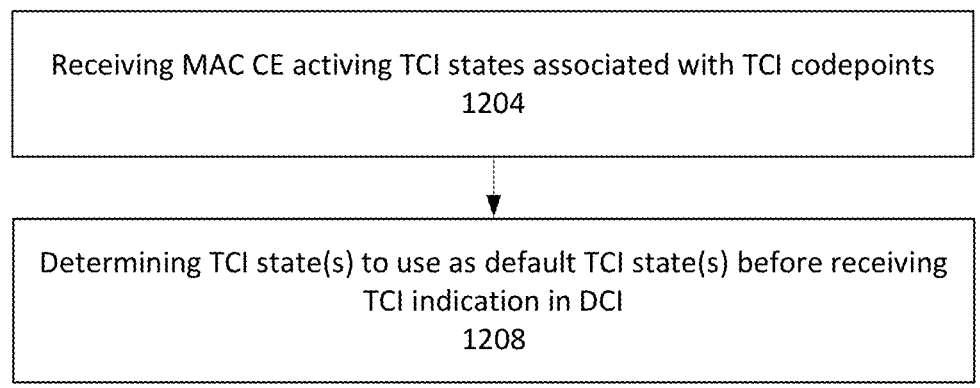
FIG. 12 illustrates another operational flow/algorithmic structure in accordance with some embodiments.

FIG. 12 illustrates an operation flow/algorithmic structure 1200 in accordance with some embodiments. The operation flow/algorithmic structure 1200 may be performed or implemented by a UE such as, for example, UE 104 or UE 1300; or components thereof, for example, baseband processor 1304A.

The operation flow/algorithmic structure 1200 may include, at 1204, receiving a MAC CE activating TCI states associated with a plurality of TCI codepoints.

The operation flow/algorithmic structure 1200 may further include, at 1208, determining TCI state(s) to use as default TCI state(s) before receiving a TCI indication in DCI.

In some embodiments, the default TCI state(s) may be determined by selecting TCI state(s) of a lowest TCI codepoint as the default TCI state(s). If the TCI state(s) of the lowest TCI codepoint only include a TCI state for one transmission direction, some embodiments may alternatively select TCI state(s) of a lowest TCI codepoint that includes both downlink and uplink TCI states as the default TCI state(s).

In other embodiments, if a lowest TCI codepoint only includes a TCI state for one transmission direction, the UE may select that TCI state for the default TCI state for that transmission direction and select another TCI state for the other transmission direction. The other TCI state may be an existing TCI state for the other transmission direction or a next lowest TCI codepoint that includes a TCI state for the other transmission direction.

In some embodiments, the selection of the default TCI states may be based on action delays associated with the TCI states of the different TCI codepoints. The action delays may be based on whether a TCI state is actively being used for a particular channel or is associated with an L1-RSRP report transmitted within a predetermined time window prior to receipt of the MAC CE. If the action delays for multiple TCI states are the same, the lowest TCI codepoint may be used.

Figure 13:
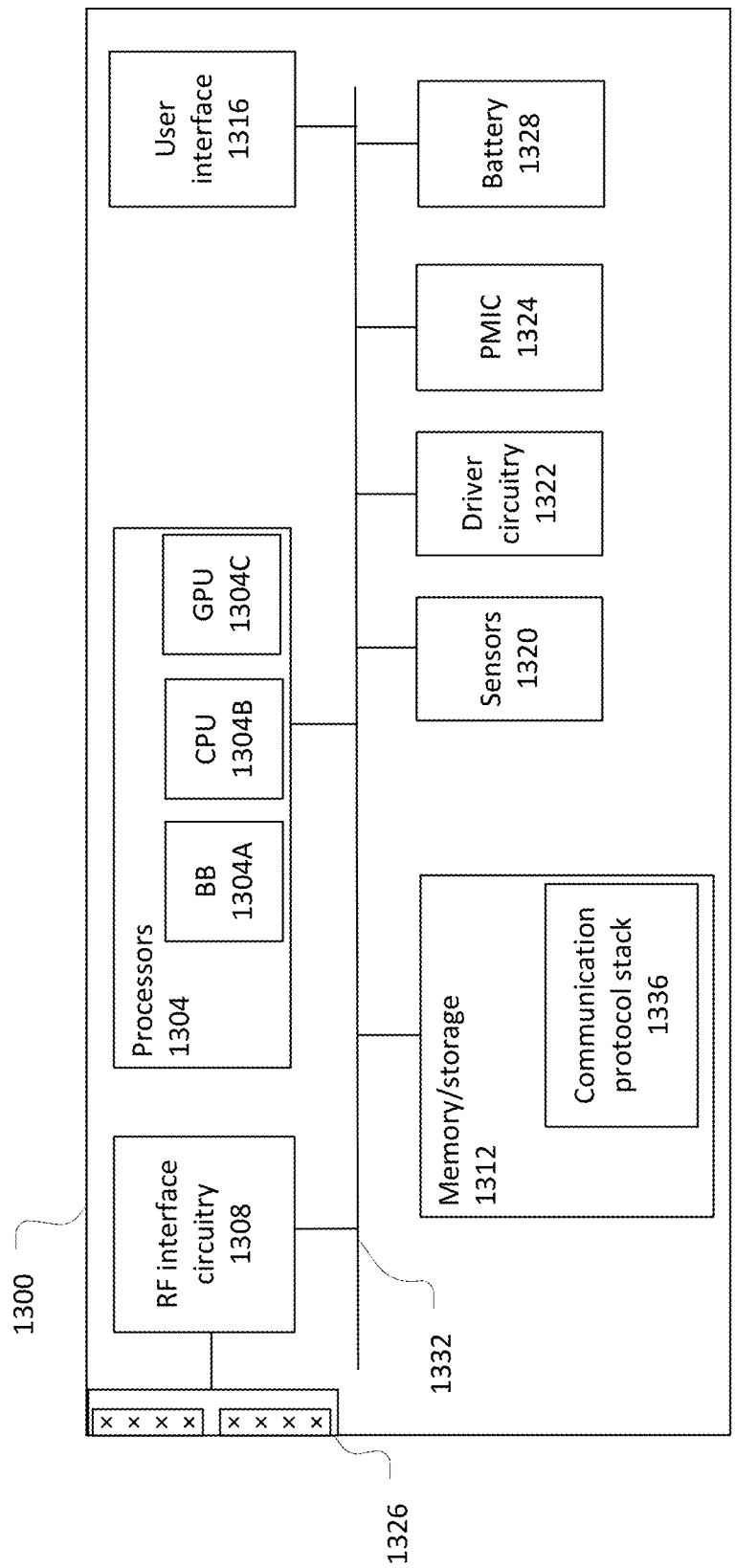
FIG. 13 illustrates a user equipment in accordance with some embodiments.

FIG. 13 illustrates a UE 1300 in accordance with some embodiments. The UE 1300 may be similar to and substantially interchangeable with UE 104 of FIG. 1.

The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor 1304A may access a communication protocol stack 1336 in the memory/storage 1312 to communicate over a 3GPP compatible network. In general, the baseband processor 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1308.

The baseband processor 1304A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 1326.

In various embodiments, the RF interface circuitry 1308 may be configured to transmit/receive signals in a manner compatible with NR access technologies.

The antenna structure 1326 may include antenna elements to convert electrical signals into radio waves to travel through the air and to convert received radio waves into electrical signals. The antenna elements may be arranged into one or more antenna panels. The antenna structure 1326 may have antenna panels that are omnidirectional, directional, or a combination thereof to enable beamforming and multiple input, multiple output communications. The antenna structure 1326 may include microstrip antennas, printed antennas fabricated on the surface of one or more printed circuit boards, patch antennas, phased array antennas, etc. The antenna structure 1326 may have one or more panels designed for specific frequency bands including bands in FR1 or FR2.

The user interface 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensors 1320 and control and allow access to sensors 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300 including DRX as discussed herein.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
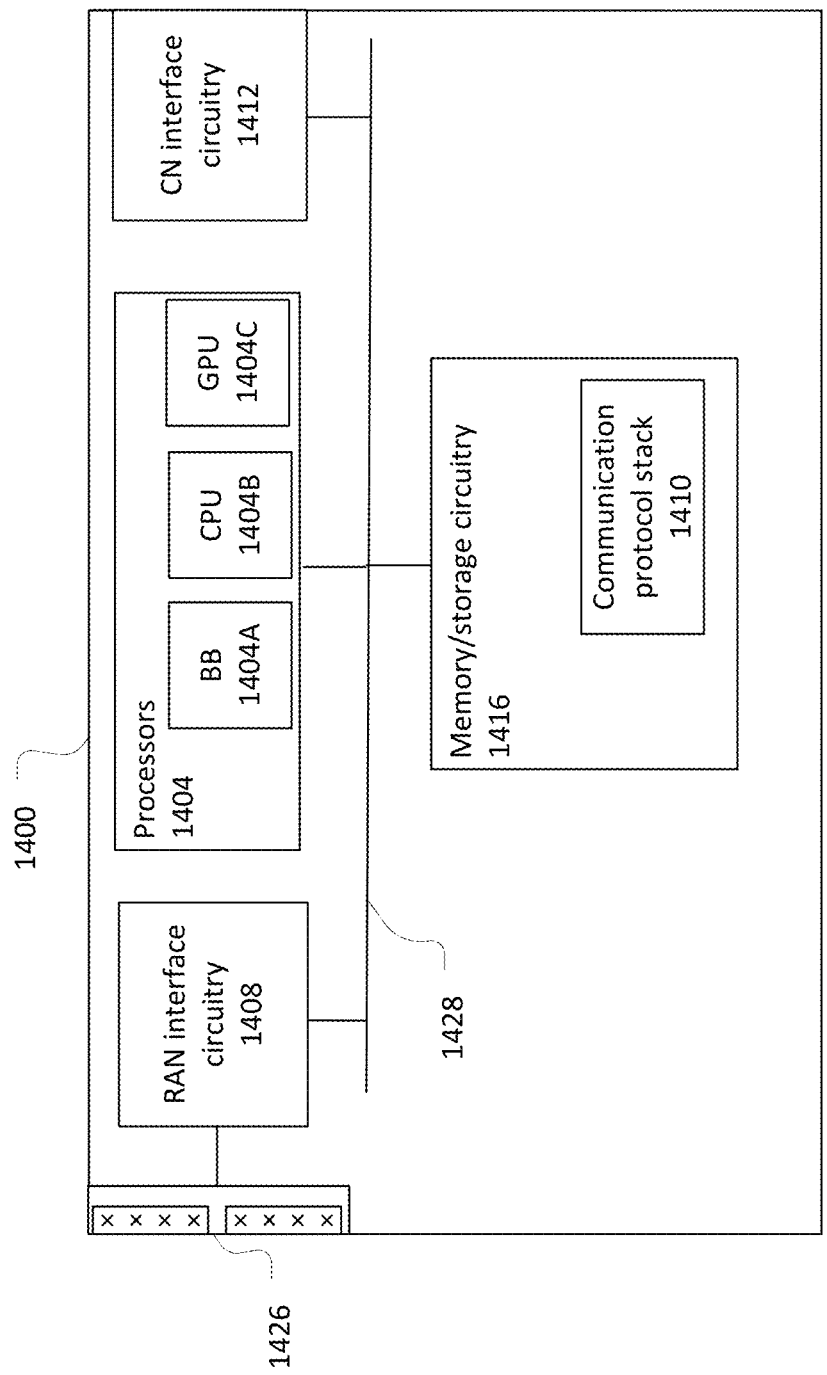
FIG. 14 illustrates a gNB in accordance with some embodiments.

FIG. 14 illustrates a gNB 1400 in accordance with some embodiments. The gNB node 1400 may similar to and substantially interchangeable with base station(s) 108 of FIG. 1.

The gNB 1400 may include processors 1404, RF interface circuitry 1408, core network "CN" interface circuitry 1412, memory/storage circuitry 1416, and antenna structure 1426.

The components of the gNB 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 10.

The CN interface circuitry 1412 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

In some embodiments, the gNB 1400 may be coupled with TRPs, such as TRPs 142 or 146, using the antenna structure 1426, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: receiving downlink control information, DCI, that includes a transmission configuration indicator, TCI, indication; determining that the DCI does not schedule a data transmission; generating hybrid automatic repeat request-acknowledgment, HARQ-ACK, feedback corresponding to the DCI; and transmitting the HARQ-ACK feedback.

Example 2 includes a method of example 1 or some other example herein, wherein determining that the DCI does not schedule a data transmission comprises: determining a type of a radio network temporary identifier, RNTI, used to scramble cyclic redundancy check, CRC, bits of the DCI; and determining that the DCI does not schedule a data transmission based on the type of the RNTI.

Example 3 includes a method of example 1 or some other example herein, wherein determining that the DCI does not schedule a data transmission comprises: detecting a value of a field of the DCI; and determining that the DCI does not schedule a data transmission based on the value.

Example 4 includes the method of example 3 or some other example herein, wherein the field is a HARQ process number field and the value is zero; the field is a redundancy version field and the value is zero; the field is a modulation and coding scheme, MCS, field and the value is one; or the field is a frequency domain resource assignment, FDRA, field and the value is: all zeros for a type-0 resource allocation or a dynamic switch resource allocation; or all ones for a type-1 resource allocation.

Example 5 includes a method of example 3 or some other example herein, wherein a configured scheduling-RNTI, CS-RNTI, is used to scramble cyclic redundancy check, CRC, bits of the DCI and the field is a HARQ process number field and the value is one; the field is a redundancy version field and the value is one; the field is a modulation and coding scheme, MCS, field and the value is zero; or the field is a frequency domain resource assignment, FDRA, field and the value is: all zeros for a type-0 resource allocation or a dynamic switch resource allocation; or all ones for a type-1 resource allocation.

Example 6 includes the method of example 1 or some other example herein, wherein the DCI is first DCI and the method further comprises: receiving second DCI to schedule a data transmission; and ignoring a TCI indication in the second DCI or utilize the TCI indication for an operation other than a TCI update.

Example 7 includes a method of example 1 or some other example herein, wherein the DCI includes a time domain resource allocation, TDRA, value and the method further comprises: determining a virtual downlink slot based on the TDRA value; determining a configured K1 value; determining a HARQ-ACK slot based on the K1 value and the TDRA value; and transmitting the HARQ-ACK feedback in the HARQ-ACK slot.

Example 8 includes the method of example 1 or some other example herein, wherein the HARQ-ACK feedback includes an acknowledgement, ACK, and the method further comprises: transmitting a plurality of repetitions of the ACK in a corresponding plurality of slots; and determining an action delay to institute a new beam based on the TCI indication, wherein a starting point for the action delay is based on: a slot of the plurality of slots that includes a first repetition of the ACK, a slot of the plurality of slots that includes a last repetition of the ACK, or a slot of the plurality of slots that includes a predetermined repetition of the ACK, the predetermined repetition between the first and last repetition and being based on a capability of the UE or a configuration from a base station.

Example 9 includes the method of example 1 or some other example herein, wherein the HARQ-ACK feedback includes an acknowledgement, ACK; the DCI includes a trigger for an aperiodic sounding reference signal, SRS; and the method further comprises: transmitting the aperiodic SRS transmission in a first slot; transmitting the ACK in a second slot; and determining an action delay to institute a new beam based on the TCI indication, wherein a starting point for the action delay is based on the first slot or the second slot.

Example 10 includes a method of operating a UE, the method comprising: storing hybrid automatic repeat request-acknowledgment, HARQ-ACK, timing information; receiving downlink control information, DCI, that schedules a downlink transmission and includes a transmission configuration indicator, TCI, indication; generating HARQ-ACK feedback to include a first bit that corresponds to the downlink transmission and a second bit that corresponds to the TCI indication; and transmitting a HARQ report, which includes the HARQ-ACK feedback, based on the HARQ-ACK timing information.

Example 11 includes the method of example 10 or some other example herein, wherein the HARQ-ACK feedback includes X bits corresponding to one or more TCI indications transmitted within downlink slots corresponding to the HARQ report, wherein X is an integer that is equal to: a maximum number of TCI updates allowed within the downlink slots; a number of bands or band groups, wherein only one TCI update is allowed within the downlink slots; two multiplied by a number of bands or band groups, wherein only one uplink TCI update and one downlink TCI updated is allowed within the downlink slots; or a number of TCI codepoints multiplied by a number of bands or band groups.

Example 12 includes the method of example 10 or some other example herein, wherein the HARQ-ACK feedback includes X bits corresponding to one or more TCI indications transmitted within downlink slots corresponding to the HARQ report, wherein X comprises: one bit that corresponds to a single TCI update that is to apply to all component carriers; or two bits with a first bit to correspond to a downlink TCI update and a second bit to correspond to an uplink TCI update that is to apply to all component carriers.

Example 13 includes the method of example 11 or 12 or some other example herein, further comprising determining a value of X based on configuration information received from a base station.

Example 14 includes the method of example 10 or some other example herein, wherein the HARQ-ACK feedback corresponds to a plurality of slots and includes a pair of values for individual slots of the plurality of slots, a first value of the pair of values to indicate whether DCI that schedules a downlink transmission for the individual slot was successfully received and a second value of the pair of values to indicate whether the downlink transmission for the individual slot was successfully received.

Example 15 includes the method of example 10 or some other example herein, wherein the HARQ-ACK feedback includes a bit value for each downlink assignment index, DAI, of a sequence of DAIs, wherein a first subset of the sequence of DAIs correspond to downlink transmissions in a plurality of slots and a second subset of the sequence of DAIs correspond to one or more TCI updates in the plurality of slots.

Example 16 includes a method of example 10 or some other example herein, further comprising: detecting, within the DCI, a trigger for an aperiodic sounding reference signal, SRS; and transmitting the aperiodic SRS transmission.

Example 17 includes a method of operating a base station, the method comprising: transmitting downlink control information, DCI, to a user equipment, UE, the DCI to include a transmission configuration indicator, TCI, update and a trigger for an aperiodic sounding reference signal, SRS; and determine whether the TCI update was received by the UE based on whether the aperiodic SRS is received by the base station.

Example 18 includes the method of example 17 or some other example herein, wherein the DCI is to schedule a downlink transmission in a slot and the method further comprises: receiving, from the UE, a negative acknowledgment from the UE corresponding to the slot; determining, based on whether the aperiodic SRS is received by the base station, whether the negative acknowledgment from the UE indicates that the DCI was not successfully received or the downlink transmission was not successfully received.

Example 19 includes a method of operating a user equipment, UE, the method comprising: receiving, from a base station, a media access control, MAC, control element, CE, to activate transmission configuration indicator, TCI, states associated with a plurality of TCI codepoints; and determining one or more TCI states to use as default TCI state(s) before reception of a TCI indication in downlink control information, DCI.

Example 20 includes the method of example 19 or some other example herein, wherein determining the one or more TCI states to use as default TCI state(s) comprises: selecting TCI state(s) of a lowest TCI codepoint as the default TCI state(s); selecting TCI state(s) of a lowest TCI codepoint that includes both downlink and uplink TCI states as the default TCI state(s); or if a lowest TCI codepoint includes only one TCI state, which corresponds to a first transmission direction, selecting, for the default TCI state(s), the one TCI state for the first transmission direction and a second TCI state for a second transmission direction, the second TCI state selected from an existing TCI state for the second transmission direction or a next lowest TCI codepoint that includes a TCI state for the second transmission direction.

Example 21 includes the method of example 19 or 20 or some other example herein, wherein determining the one or more TCI states to use as default TCI state(s) comprises: determining action delays for the TCI states associated with the plurality of TCI codepoints; and determining the one or more TCI states to use as default TCI state(s) based on the action delays.

Example 22 includes the method of example 21 or some other example herein, wherein determining the action delays for the TCI states is based on whether a TCI state is actively being used for a particular channel or is associated with a layer 1-reference signal receive power report transmitted within a predetermined time window prior to receipt of the MAC CE.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer-readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a datagram, information element, packet, frame, segment, PDU, or message as described in or related to any of examples 1-22, or portions or parts thereof, or otherwise described in the present disclosure.

Example 30 may include a signal encoded with data as described in or related to any of examples 1-22, or portions or parts thereof, or otherwise described in the present disclosure.

Example 31 may include a signal encoded with a datagram, IE, packet, frame, segment, PDU, or message as described in or related to any of examples 1-22, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 33 may include a computer program comprising instructions, wherein execution of the program by a processing element is to cause the processing element to carry out the method, techniques, or process as described in or related to any of examples 1-22, or portions thereof.

Example 34 may include a signal in a wireless network as shown and described herein.

Example 35 may include a method of communicating in a wireless network as shown and described herein.

Example 36 may include a system for providing wireless communication as shown and described herein.

Example 37 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
processing circuitry to:
receive downlink control information (DCI) that includes an indication of a transmission configuration indicator (TCI) state;
generate, for transmission to a base station, a positive hybrid automatic repeat request (HARQ)-acknowledgement (ACK) corresponding to receipt of DCI or a physical downlink shared channel (PDSCH) transmission scheduled by the DCI; and
apply the TCI state in a slot that is at least a predetermined period of time after transmission of the positive HARQ-ACK; and
interface circuitry coupled with the processing circuitry to enable communication.

2. The apparatus of claim 1, wherein the processing circuitry is further to:
generate a physical uplink control channel (PUCCH) or physical uplink shared channel (PUSCH) transmission to include the positive HARQ-ACK.

3. The apparatus of claim 1, wherein the DCI does not schedule a data transmission and the positive HARQ-ACK corresponds to receipt of the DCI.

4. The apparatus of claim 1, wherein the DCI schedules a PDSCH transmission and the positive HARQ-ACK corresponds to receipt of the PDSCH transmission.

5. The apparatus of claim 1, wherein the DCI is first DCI, the TCI state is a first TCI state, and the processing circuitry is further to:
receive a second DCI that schedules a PDSCH transmission and includes an indication of a second TCI state;
detect a failure to decode the PDSCH transmission;
generate, for transmission to the base station, a negative HARQ-ACK based on detection of the failure to decode the PDSCH transmission; and
refrain from applying the second TCI state based on the negative HARQ-ACK.

6. The apparatus of claim 1, wherein the processing circuitry is further to:
receive radio resource control (RRC) signaling that configures the apparatus with a list of TCI states that includes the TCI state.

7. A method comprising:
receiving a downlink control information (DCI) that includes an indication of a transmission configuration indicator (TCI) state;
generating, for transmission to a base station, a positive hybrid automatic repeat request (HARQ)-acknowledgement (ACK) corresponding to receipt of the DCI or a physical downlink shared channel (PDSCH) transmission scheduled by the DCI; and
applying the TCI state in a slot that is at least a predetermined period of time after the transmission of the positive HARQ-ACK.

8. The method of claim 7, further comprising:
generating a physical uplink control channel (PUCCH) or physical uplink shared channel (PUSCH) transmission to include the positive HARQ-ACK.

9. The method of claim 7, wherein the DCI does not schedule a data transmission and the positive HARQ-ACK corresponds to receipt of the DCI.

10. The method of claim 7, wherein the DCI schedules a PDSCH transmission and the positive HARQ-ACK corresponds to receipt of the PDSCH transmission.

11. The media method of claim 7, wherein the DCI is first DCI, the TCI state is a first TCI state, and the method further comprises:
receiving a second DCI that schedules a PDSCH transmission and includes an indication of a second TCI state;
detecting a failure to decode the PDSCH transmission;
generating, for transmission to the base station, a negative HARQ-ACK based on detection of the failure to decode the PDSCH transmission; and
refraining from applying the second TCI state based on the negative HARQ-ACK.

12. The method of claim 7, further comprising:
receiving radio resource control (RRC) signaling that configures an apparatus with a list of TCI states that includes the TCI state.

13. A method comprising:
generating, for transmission to a user equipment (UE), downlink control information (DCI) with an indication of a transmission configuration indicator (TCI) state;
receiving a positive hybrid automatic repeat request (HARQ)-acknowledgement (ACK) corresponding to receipt of the DCI or a physical downlink shared channel (PDSCH) transmission scheduled by the DCI; and
determining that the UE is to apply the TCI state in a slot that is at least a predetermined period of time after transmission of the positive HARQ-ACK.

14. The method of claim 13, further comprising:
receiving a physical uplink control channel (PUCCH) or physical uplink shared channel (PUSCH) transmission that includes the positive HARQ-ACK.

15. The method of claim 13, wherein the DCI does not schedule a data transmission and the positive HARQ-ACK corresponds to receipt of the DCI.

16. The method of claim 13, wherein the DCI schedules a PDSCH transmission and the positive HARQ-ACK corresponds to receipt of the PDSCH transmission.

17. The method of claim 13, wherein the DCI is first DCI, the TCI state is a first TCI state, and the method further comprises:
generating, for transmission to the UE, a second DCI that schedules a PDSCH transmission and includes an indication of a second TCI state;
receiving a negative HARQ-ACK associated with the second DCI or the PDSCH transmission; and
determining that the UE will not apply the second TCI state based on receiving the negative HARQ-ACK.

* * * * *